United States Patent
Hyuga et al.

(10) Patent No.: US 7,161,611 B2
(45) Date of Patent: Jan. 9, 2007

(54) EXPOSURE SYSTEM

(75) Inventors: Hiroaki Hyuga, Kanagawa-ken (JP); Toshiro Hayakawa, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 204 days.

(21) Appl. No.: 11/012,164

(22) Filed: Dec. 16, 2004

(65) Prior Publication Data

US 2005/0151829 A1    Jul. 14, 2005

(30) Foreign Application Priority Data

Dec. 17, 2003  (JP) ............................. 2003/419645

(51) Int. Cl.
  *B41J 2/447*  (2006.01)
  *B41J 2/45*   (2006.01)
  *B41J 2/475*  (2006.01)

(52) U.S. Cl. ...................... 347/238; 347/130
(58) Field of Classification Search ................ 347/130, 347/238
  See application file for complete search history.

(56) References Cited

U.S. PATENT DOCUMENTS

| 6,121,993 A * | 9/2000 | Maekawara et al. ........ 347/236 |
| 6,731,322 B1 | 5/2004 | Hori |
| 2004/0189556 A1* | 9/2004 | Tsujino et al. ................ 345/82 |
| 2005/0068355 A1* | 3/2005 | Nomura et al. ............... 347/13 |
| 2005/0078168 A1* | 4/2005 | Wada ......................... 347/241 |
| 2005/0174419 A1* | 8/2005 | Kitazawa et al. .......... 347/118 |

* cited by examiner

*Primary Examiner*—Huan Tran
(74) *Attorney, Agent, or Firm*—Sughrue Mion, PLLC

(57) ABSTRACT

In an exposure system for exposing a color photosensitive body including first, second and third photosensitive materials which respectively develop into cyan, magenta and yellow, the same parts of the photosensitive body are exposed a plurality of times respectively by the first to third linear emitting element arrays. The first to third linear emitting element arrays satisfy conditions $Ny<Nm$ and $Nc \leq Nm$, wherein $Nc$, $Nm$ and $Ny$ respectively represent the numbers of the first to third linear emitting element arrays.

12 Claims, 3 Drawing Sheets of the invention is to prevent occur-
EXPOSURE SYSTEM

BACKGROUND OF THE INVENTION

1. Field of the Invention

This invention relates to an exposure system, and more particularly to an exposure system which exposes a color photosensitive body to two-dimensional imagewise light by the use of an exposure head comprising a surface emitting element array.

2. Description of the Related Art

Conventionally, there has been known an exposure head which exposes a photosensitive body to light by the use of a surface emitting element array comprising a plurality of linear emitting element arrays arranged in a sub-scanning direction substantially perpendicular to a main scanning direction in which a plurality of light emitting elements are arranged at predetermined pitches in each linear emitting element array. Recently, there have been proposed various exposure heads in which organic EL (electroluminescent) elements are employed as the light emitting elements.

Further, there has been known, as disclosed in U.S. Pat. No. 6,731,322, an exposure system where the exposure head comprising the surface emitting element array formed by N linear emitting element arrays and the photosensitive body are moved relatively to each other in the sub-scanning direction to expose N times the same parts of the photosensitive body by the N linear emitting element arrays, thereby recording a two-dimensional image on the photosensitive body. By multiple exposure of the same parts of the photosensitive body, the dynamic range of exposure can be kept higher and the image can be recorded in a higher gradation. Further, in U.S. Pat. No. 6,731,322, there is disclosed to expose a color photosensitive body to a color image by the use of linear emitting element arrays emitting red, green and blue light in such an exposure system.

In the exposure system in which an exposure head comprising a surface emitting element array is employed, it is preferred that the light emitting characteristics of the plurality of light emitting elements be uniform in recording a fine image. Especially, if the amounts of light emission from the plurality of light emitting elements arranged in the main scanning direction are non-uniform, unevenness of density occurs in the printed image since the pixels are exposed to non-uniform light from the light emitting elements corresponding thereto even if the light emitting elements are driven on the basis of a given image signal. This unevenness of density is generally called 'score unevenness' since it extends like a score in the sub-scanning direction as the sub-scanning progresses.

In the exposure system described above where the same parts of the photosensitive body are exposed a multiple of times, N times, non-uniformity in the amounts of light emission in the main scanning direction is uniformed by superposing light from a plurality of light emitting elements and accordingly, occurrence of the score unevenness is suppressed. However, in the conventional exposure systems, the score unevenness is apt to occur in the part of cyan or magenta even if the arrangement of the multiple exposure is applied and in order to excellently suppress the score unevenness, it is necessary to arrange a great number of linear emitting element arrays in the sub-scanning direction.

SUMMARY OF THE INVENTION

In view of the foregoing observations and description, the primary object of the present invention is to prevent occurrence of the score unevenness in exposing a color image, by the use of a color exposure head comprising a plurality of linear emitting element arrays, with a relatively small number of linear emitting element arrays arranged in the sub-scanning direction.

In accordance with a first aspect of the present invention, there is provided an exposure system for exposing a color photosensitive body including therein first, second and third photosensitive materials which respectively develop into cyan, magenta and yellow comprising an exposure head formed by a surface emitting element array formed by a plurality of first to third linear emitting element arrays arranged in a sub-scanning direction substantially perpendicular to a main scanning direction, each of the first linear emitting element arrays comprising a plurality of first light emitting elements which are arranged in the main scanning direction at predetermined pitches and each of which sensitizes the first photosensitive material, each of the second linear emitting element arrays comprising a plurality of second light emitting elements which are arranged in the main scanning direction at predetermined pitches and each of which sensitizes the second photosensitive material, and each of the third linear emitting element arrays comprising a plurality of third light emitting elements which are arranged in the main scanning direction at predetermined pitches and each of which sensitizes the third photosensitive material, and a sub-scanning means which moves the color photosensitive body and the exposure head in the sub-scanning direction relatively to each other, so that the same parts of the photosensitive body are exposed a plurality of times respectively by the first to third linear emitting element arrays with progression of the sub-scanning, thereby exposing the color photosensitive body to two-dimensional imagewise light, wherein the improvement comprises that the first to third linear emitting element arrays satisfy conditions $Ny<Nm$ and $Nc \leq Nm$, wherein $Nc$, $Nm$ and $Ny$ respectively represent the numbers of the first to third linear emitting element arrays.

In the exposure system in accordance with the first aspect of the present invention, it is especially preferred that $Ny<Nc$.

Further, in the exposure system in accordance with the first aspect of the present invention, it is especially preferred that $6.25 \leq Nm/Ny$ and/or $2.78 \leq Nc/Ny$.

In accordance with a seond aspect of the present invention, there is provided an exposure system for exposing a color photosensitive body including therein first, second and third photosensitive materials which respectively develop into cyan, magenta and yellow comprising an exposure head formed by a surface emitting element array formed by a plurality of first to third linear emitting element arrays arranged in a sub-scanning direction substantially perpendicular to a main scanning direction, each of the first linear emitting element arrays comprising a plurality of first light emitting elements which are arranged in the main scanning direction at predetermined pitches and each of which sensitizes the first photosensitive material, each of the second linear emitting element arrays comprising a plurality of second light emitting elements which are arranged in the main scanning direction at predetermined pitches and each of which sensitizes the second photosensitive material, and each of the third linear emitting element arrays comprising a plurality of third light emitting elements which are arranged in the main scanning direction at predetermined pitches and each of which sensitizes the third photosensitive material, and a sub-scanning means which moves the color photosensitive body and the exposure head in the sub-scanning direction relatively to each other, so that the same parts of the photosensitive body are exposed a plurality of times respectively by the first to third linear emitting element arrays with progression of the sub-scanning, thereby exposing the color photosensitive body to two-dimensional imagewise light, wherein the improvement comprises that the first to third linear emitting element arrays satisfy conditions $\sigma c/Nc^{1/2} \leq 0.004$, $\sigma m/Nm^{1/2} \leq 0.003$, $\sigma y/Ny^{1/2} \leq 0.009$, wherein Nc, Nm and Ny respectively represent the numbers of the first to third linear emitting element arrays, and $\sigma c$, $\sigma m$ and $\sigma y$ respectively represent the dispersions of the amounts of light emission from the plurality of light emitting elements in the first to third linear emitting element arrays.

In the exposure system in accordance with the second aspect of the present invention, it is further preferred that $\sigma c/Nc^{1/2} \leq 0.003$, $\sigma m/Nm^{1/2} \leq 0.002$, $\sigma y/Ny^{1/2} \leq 0.005$.

In the exposure systems in accordance with the first and second aspects of the present invention, red, green and blue light emitting elements are suitable as the first to third light emitting elements forming the linear emitting element arrays. For example, the element may be an element comprising a combination of an aperture mask and one of an organic EL element and an LED (light emitting diode), a liquid crystal shutter element, a PLZT element or the like. Though not being a spontaneous light emitting element and being an element which modifies light emitted from a light source with a liquid crystal shutter or a PLZT shutter, and outputs the modified light, the liquid crystal shutter element and the PLZT element can be applied to the exposure system of the present invention as well as other spontaneous light emitting elements.

It is preferred that the present invention be applied to the exposure system for exposing a photosensitive body having silver halide color photosensitive material as the first to third photosensitive materials.

The optical density D which the photosensitive material develops upon exposure to light of an amount E may be approximated as D=kE (k representing the sensitivity of the photosensitive material). Accordingly, the change of the optical density with the change $\Delta E$ of the exposure E (the amount of light to which the photosensitive material is exposed) can be expressed as $k\Delta E$ ($\Delta D = k\Delta E$). That is, dispersion of density $\Delta D/D = \Delta E/E$. Therefore, even if there is a certain dispersion $\sigma$ ($\Delta E/E$) of the amounts of light emission in N light emitting elements, the difference of the amounts of light are cancelled when the same part of the photosensitive body are exposed in a plurality of times and dispersion in the amounts of light to which the part of the photosensitive body is exposed can be suppressed to $1/N^{1/2}$ of the dispersion $\sigma$ of the amounts of light emission in N light emitting elements. Accordingly, the density dispersion $\Delta D/D$ which can be detected as an unevenness of density becomes $$\Delta D/D = \Delta E/E = \sigma/N^{1/2} \tag{1}$$

In the conventional exposure system where the same parts of the photosensitive body are exposed N times by N linear emitting element arrays arranged in the sub-scanning direction, occurrence of the score unevenness is suppressed as described above. However, in the conventional exposure system, the score unevenness is apt to occur in the part of cyan or magenta unless a great number of linear emitting element arrays are arranged in the sub-scanning direction. Investigation of these inventors has revealed that this problem is due to the fact that the cyan developing linear emitting arrays, the magenta developing linear emitting arrays and the yellow developing linear emitting arrays are the same in number. This will be described in detail, hereinbelow.

FIG. 4 is a graph showing the frequency-dependency of the human visual sensitivity versus the density unevenness of the image. In FIG. 4, the density dispersion $\Delta D/D$ at the limit where the human being can detect as the density unevenness is plotted on the ordinate versus spatial frequencies on the abscissa. That is, as the curve of this graph lies lower, smaller density dispersion can be detected as the density unevenness or the sensitivity becomes higher.

Generally, a silver-salt color photosensitive body includes the cyan developing photosensitive material, the magenta developing photosensitive material, and the yellow developing photosensitive material. However, the human visual sensitivity to the density unevenness is not uniform in cyan, magenta and yellow and higher to magenta, cyan, and yellow in this order as shown in FIG. 4. That is, the density dispersion $\Delta D/D$ of up to 0.003 (at the least) can be detected as the density unevenness in the case of cyan, the density dispersion $\Delta D/D$ of up to 0.002 (at the least) can be detected as the density unevenness in the case of magenta, and the density dispersion $\Delta D/D$ of up to 0.005 (at the least) can be detected as the density unevenness in the case of yellow.

Therefore, when N linear emitting arrays are arranged in the sub-scanning direction for each color in order to obtain the superposing effect described above, there can arise a problem that the density unevenness in magenta can be still detected even if the density unevenness in yellow comes not to be detected. The density unevenness in magenta will come not to be detected if the number N of the linear emitting arrays is greatly increased. However this approach is disadvantageous in that an excessive number of linear emitting arrays are provided for, e.g., yellow and the cost of the exposure system is unnecessarily increased.

This invention has been made on the basis of the above recognition, and in the exposure system in accordance with the first aspect of the present invention, since the numbers Nc, Nm and Ny of the cyan developing linear emitting arrays (the first linear emitting arrays), the magenta developing linear emitting arrays (the second linear emitting arrays), and the yellow developing linear emitting arrays (the third linear emitting arrays) are set so that Ny<Nm and Nc≦Nm, the number Nm of the linear emitting arrays for magenta to which the human visual sensitivity to the density unevenness is relatively high is made larger while the number Ny of the linear emitting arrays for yellow to which the human visual sensitivity to the density unevenness is relatively low is made smaller to certainly prevent occurrence of the density unevenness, whereby unnecessary increase in the cost of the exposure system due to excessive number of the linear emitting arrays can be avoided. This is basically the same as in the relation between magenta and cyan but Nc may be equal to Nm since the difference between the human visual sensitivity to the density unevenness to magenta and the human visual sensitivity to the density unevenness to cyan is relatively small as can be seen from FIG. 4.

Further, when Ny<Nc in the exposure system in accordance with the first aspect of the present invention, occurrence of the score unevenness in cyan where the score unevenness is more sensitive than in yellow is certainly suppressed while unnecessary increase in the cost of the exposure system due to excessive number of the yellow developing linear emitting arrays can be avoided in a similar manner.

Further, when $6.25 \leq Nm/Ny$ in the exposure system in accordance with the first aspect of the present invention, the effect that occurrence of the score unevenness in magenta where the score unevenness is more sensitive is certainly suppressed while unnecessary increase in the cost of the exposure system due to excessive number of the yellow developing linear emitting arrays can be avoided can be more certainly obtained. That is, when the density dispersion at the limit where it can be detected as a density unevenness for magenta is taken as $\Delta D/Dm$ and the density dispersion at the limit where it can be detected as a density unevenness for yellow is taken as $\Delta D/Dy$ in FIG. 4, $(\Delta D/Dy)/(\Delta D/Dm) \approx 0.0.005/0.002 = 2.5$. Accordingly, if $2.5 \leq (Nm/Ny)^{2/1}$, that is, $6.25 \leq Nm/Ny$, the above effect can be obtained more certainly on the basis of formula (1).

Similarly, when $2.78 \leq Nc/Ny$ in the exposure system in accordance with the first aspect of the present invention, the effect that occurrence of the score unevenness more sensitive in cyan is certainly suppressed while unnecessary increase in the cost of the exposure system due to excessive number of the yellow developing linear emitting arrays can be avoided can be more certainly obtained. That is, when the density dispersion at the limit where it can be detected as a density unevenness for cyan is taken as $\Delta D/Dc$ and the density dispersion at the limit where it can be detected as a density unevenness for yellow is taken as $\Delta D/Dy$ in FIG. 4, $(\Delta D/Dy)/(\Delta D/Dc) \approx 0.005/0.003 = 5/3$. Accordingly, if $5/3 \leq (Nc/Ny)^{2/1}$, that is, $(5/3)^2 = 2.78 \leq Nc/Ny$, the above effect can be obtained more certainly on the basis of formula (1).

Though FIG. 4 shows characteristics for obtaining a super-high image quality where no density unevenness can be detected under substantially any condition, an image quality at a level where a density unevenness can be detected when gazing at the image will be sufficient for a general user. In such a case, the density dispersion $\Delta D/D$ at the limit where it can be detected as a density unevenness is increased by about 1.5 times and becomes to 0.004, 0.003 and 0.009 for cyan, magenta and yellow, respectively.

In the exposure system in accordance with the second aspect of the present invention, the density dispersions $\Delta D/D$ for cyan, magenta and yellow are made smaller than the values at the limit where a density unevenness can be detected on the basis of the recognition described above and formula (1). That is, by making $\sigma c/Nc^{1/2} \leq 0.004$, $\sigma m/Nm^{1/2} \leq 0.003$, $\sigma y/Ny^{1/2} \leq 0.009$, occurrence of the score unevenness can be suppressed to such an extent that a density unevenness cannot be detected unless the image is gazed at.

When the density dispersions $\Delta D/D$ are made stricter and values shown in FIG. 4 are applied, that is, when $\sigma c/Nc^{1/2} \leq 0.003$, $\sigma m/Nm^{1/2} \leq 0.002$, $\sigma y/Ny^{1/2} \leq 0.005$, a super-high image quality where no density unevenness can be detected under substantially any condition can be realized.

DESCRIPTION OF THE PREFERRED EMBODIMENT

Figure 1:
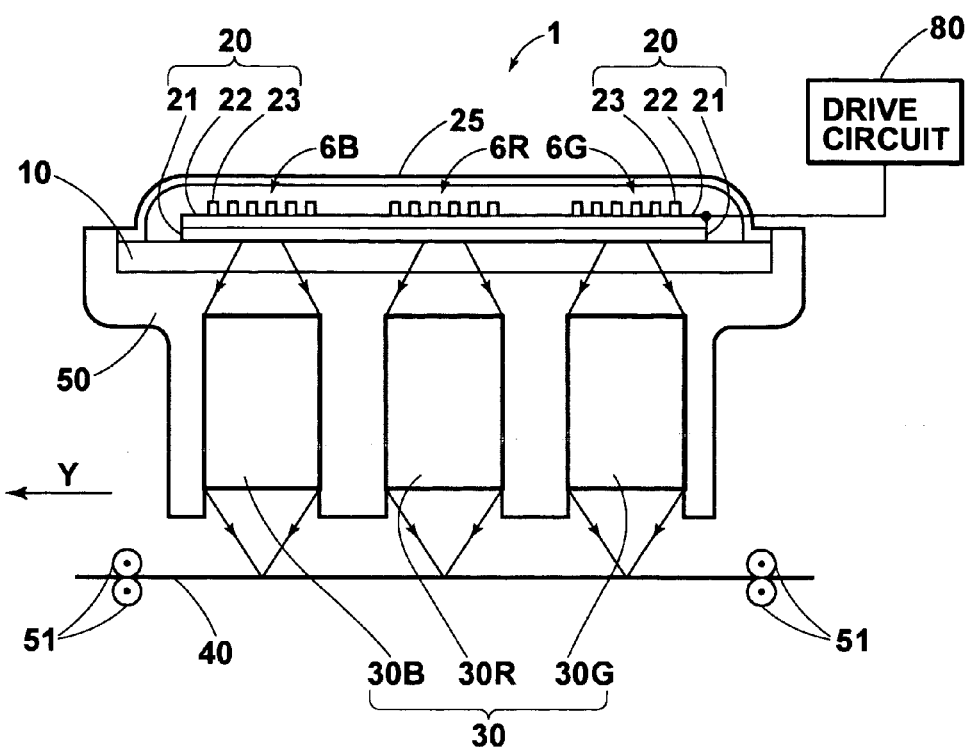
FIG. 1 is a side view of an exposure system in accordance with an embodiment of the present invention.

As shown in FIG. 1, an exposure system 5 in accordance with an embodiment of the present invention has an exposure head 1. The exposure head 1 comprises a transparent base 10, a number of organic EL elements 20 formed on the base 10 by deposition, a refractive index profile type lens array 30 (30R, 30G and 30B) which is a unit system for imaging on a color photosensitive sheet 40 an image generated by the light emitted from the organic EL elements 20, and a support 50 which supports the base 10 and the refractive index profile type lens array 30.

The exposure system 5 further comprises, in addition to the exposure head 1, a sub-scanning means 51 in the form of, for instance, a pair of nip rollers which conveys the color photosensitive sheet 40 at a constant speed in a direction of arrow Y.

The organic EL elements 20 comprises a transparent anode 21, an organic compound layer 22 including a light emitting layer and patterned for each pixel and a metal cathode 23 formed in sequence by deposition on a transparent base 10 such as of glass. The elements forming the organic EL elements 20 are arranged in a sealing member 25 which may be, for instance, a can of a stainless steel. That is, the base 10 is bonded to the edge of the sealing member 25 by adhesive and the organic EL elements 20 are sealed in the sealing member 25 filled with dry nitrogen gas.

When a predetermined voltage is imparted between the transparent anode 21 and the metal cathode 23, the light emitting layer included in the organic compound layer 22 emits light, which is taken out through the transparent anode 21 and the transparent base 10. The organic EL element 20 is excellent in wavelength stability. The arrangement of the organic EL elements 20 will be described in detail later.

The transparent anode 21 is preferably not lower than 50% and more preferably not lower 70% in transmittance to visible light in the wavelength range of 400 nm to 700 nm, and may be of known material such as tin oxide, indium•tin oxide (ITO), indium•zinc oxide, and the like. Film of metal such as gold, platinum or the like which is large in work function may be employed as the transparent anode. Further, the transparent anode may be of an organic compound such as polyaniline, polythiophene, polypyrrole or a derivative of these compounds. Transparent conductive films shown in "New development of transparent conductive material" supervised by Yutaka Sawada, CMC, 1999, may be applied to the present invention. Further, the transparent anode 21 may be formed on the base 10 by vacuum deposition, sputtering or ion plating.

The organic compound layer 22 may either be of a single layer of the light emitting layer or may be provided with, in addition to the light emitting layer, a hole injecting layer, a hole transfer layer, an electron injecting layer and/or an electron transfer layer, as desired. For example, the organic compound layer 22 and the electrodes may comprise an anode/a hole injecting layer/a hole transfer layer/a light emitting layer/an electron transfer layer/a cathode, an anode/a light emitting layer/an electron transfer layer/a cathode, or an anode/a hole transfer layer/a light emitting layer/an electron transfer layer/a cathode. Further, each of the light emitting layer, the hole transfer layer, the hole injecting layer and the electron injecting layer may be provided in a plurality of layers.

The metal cathode 23 is preferably formed of metal material which is small in work function, e.g., alkaline metal such as Li or K, or alkaline earth metal such as Mg or Ca, or alloy or mixture of these metals with Ag or Al. In order for the shelf stability and the electron-injectability at the cathode to be compatible with each other, the electrode formed of material described above may be coated with metal with is large in work function and high in conductivity, e.g., Ag, Al Au or the like. The metal cathode 23 may be formed by a known method such as vacuum deposition, sputtering or ion plating as the transparent anode 21.

Figure 2:
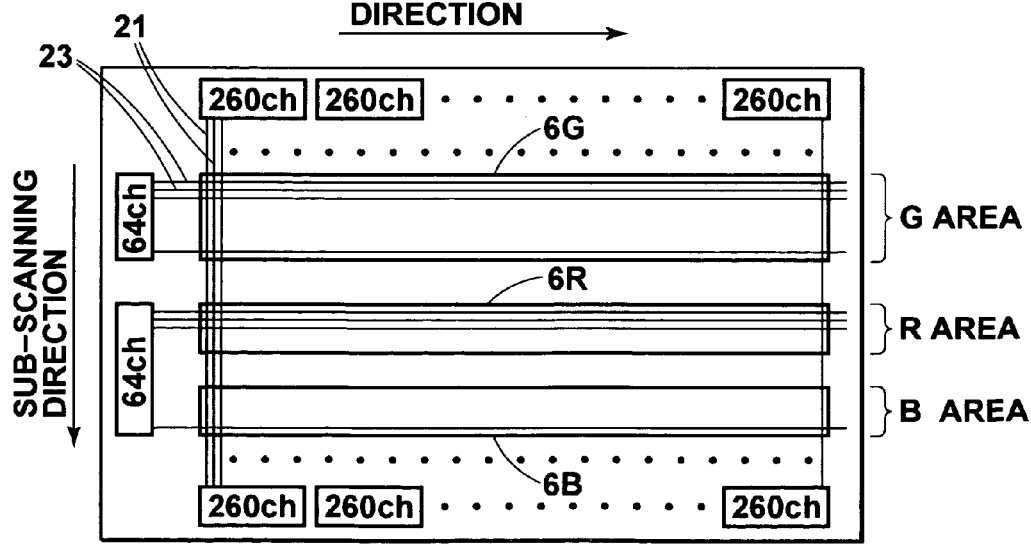
FIG. 2 is a schematic plan view of the exposure head of the exposure system.
Figure 3:
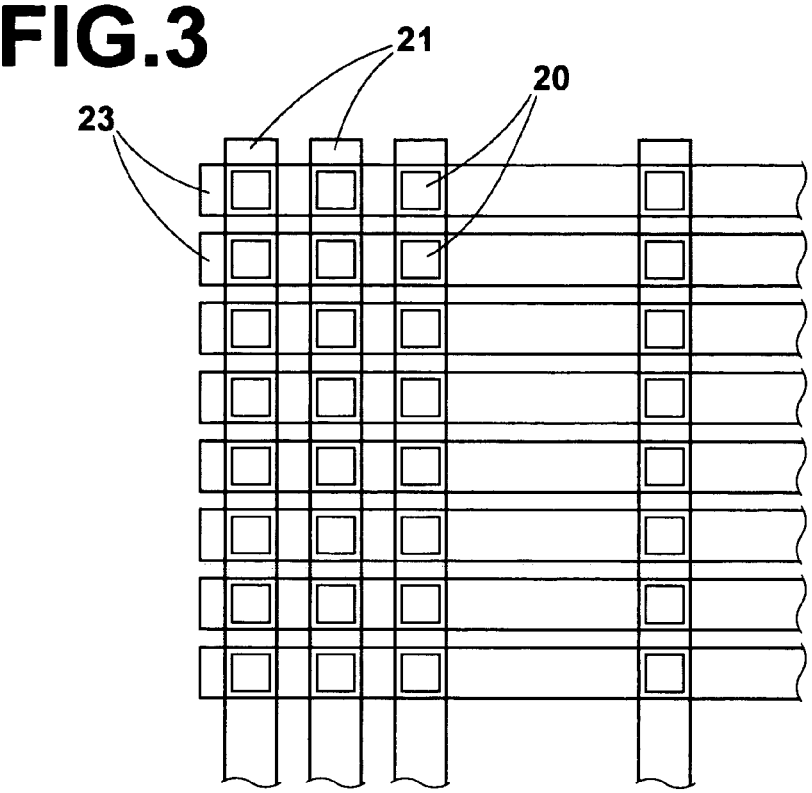
FIG. 3 is a plan view showing the arrangement of the electrodes in the exposure head.

Arrangement of the organic EL elements 20 will be described in detail, hereinbelow. FIG. 2 is a view showing the arrangement of the transparent anodes 21 and the metal cathodes 23 in the exposure head 1 and FIG. 3 is a view showing the arrangement in an enlarged scale. As shown in FIGS. 2 and 3, each of the transparent anodes 21 is patterned into a predetermined shape extending substantially in the sub-scanning direction and common to the organic EL elements 21 arranged in this direction. In this particular embodiment, 7800 (=260×30) of the transparent anodes 21 are arranged in the main scanning direction. Each of the metal cathodes 23 linearly extends in the main scanning direction and common to the organic EL elements 21 arranged in this direction. In this particular embodiment, 128 of the metal cathodes 23 are arranged in the sub-scanning direction.

The transparent anodes 21 and the metal cathodes 23 respectively form column electrodes and row electrodes and a predetermined voltage is imparted by a drive circuit 80 shown in FIG. 1 between the transparent anode 21 selected according to the image signal and the metal cathode 23 driven in sequence. When a voltage is imparted between one of the transparent anode 21 and one of the metal cathode 23, the light emitting layer included in the organic compound layer 22 disposed at the intersection of the transparent anode 21 and the metal cathode 23 applied with the voltage emits light and the light is taken out through the transparent base 10. That is, in this embodiment, one organic EL element 20 is formed at each of the intersections of the transparent anode 21 and the metal cathode 23 and a plurality of organic EL elements are arranged in the main scanning direction at predetermined pitches to form a linear emitting element array with a plurality of the linear light emitting element arrays are arranged in the sub-scanning direction to form a surface emitting element array.

As can be understood from the description above, a so-called passive matrix drive system is employed in this embodiment. Since the passive matrix drive system is known, it will not be described in detail, here. It is possible to employ an active matrix drive system in which a switching element such as a TFT (Thin Film Transistor) is employed.

In this particular embodiment, a halogenated silver color paper having layers including therein first, second and third photosensitive materials which respectively develop into cyan, magenta and yellow is employed as a color photosensitive sheet 40, and the exposure head 1 is adapted to exposure of a full color latent image to the color photosensitive sheet 40. The arrangement for this purpose will be described in detail, hereinbelow.

The organic EL elements 20 comprises those emitting red light, green light and blue light according to the light emitting layer included in the organic compound layer 22. In order to separate the organic EL elements according to the color of light emitted from the organic EL elements, those emitting red light, green light and blue light are sometimes referred to as "the organic EL element 20R", "the organic EL element 20G", and "the organic EL element 20B", respectively, hereinbelow. The first photosensitive material of the color photosensitive body 40 develops into cyan upon exposure to red light emitted from the organic EL element 20R, the second photosensitive material develops into magenta upon exposure to green light emitted from the organic EL element 20G and the third photosensitive material develops into yellow upon exposure to blue light emitted from the organic EL element 20B.

The organic EL elements 20R are disposed in R area in FIG. 2. 7800 organic EL elements 20R are arranged in the main scanning direction to form one linear red light emitting element array and 32 linear red light emitting element arrays form a surface red light emitting element array 6R.

The organic EL elements 20G are disposed in G area in FIG. 2. 7800 organic EL elements 20G are arranged in the main scanning direction to form one linear green light emitting element array and 64 linear green light emitting element arrays form a surface green light emitting element array 6G.

The organic EL elements 20B are disposed in B area in FIG. 2. 7800 organic EL elements 20B are arranged in the main scanning direction to form one linear blue light emitting element array and 32 linear blue light emitting element arrays form a surface blue light emitting element array 6B.

However, in FIG. 1, only six linear light emitting element arrays are shown to form each surface light emitting element array for the purpose of simplicity.

In this particular embodiment, R area, G area and B area are formed on one glass substrate, and two areas comprising the G area and the R and B areas are simultaneously driven in passive matrix independently of each other. (dual scan) For driving the transparent anodes of the G area, thirty 260 ch (channel) anode drive ICs are connected in series in cascade connection, and for driving the metal cathodes of the G area, a 64 ch cathode drive IC is provided. For driving the transparent anodes of the R and B areas, thirty 260 ch (channel) anode drive ICs are connected in series in cascade connection, and for driving the metal cathodes of the R and B areas, a 64 ch cathode drive IC is provided. The ICs 62 in total numbers are arranged in COF (Chip on Flex) to surround the glass substrate on which the R, G and B areas are formed.

In the exposure system 5 shown in FIG. 1, when the color photosensitive sheet 40 is to be image-wise exposed, the surface red light emitting element array 6R, the surface green light emitting element array 6G, and the surface blue light emitting element array 6B of the exposure head 1 are selectively driven by the drive circuit 80 according respectively to red image data, green image data, and blue image data while the sub-scanning means 51 conveys the color photosensitive sheet 40 in the sub-scanning direction shown by arrow Y at a constant speed.

At this time, an image by green light from the 64 linear green light emitting element arrays of the surface green light emitting element array 6G, an image by red light from the 32 linear red light emitting element arrays of surface red light emitting element array 6R, and an image by blue light from the 32 linear blue light emitting element arrays of surface blue light emitting element array 6R, are respectively imaged on the color photosensitive sheet 40 in a unit magnification by the refractive index profile type lens arrays 30G, 30R and 30B. With this, the areas exposed to the green light from the 64 linear green light emitting element arrays are then exposed to the red light from the 32 linear red light emitting element arrays and then exposed to the blue light from the 32 linear blue light emitting element arrays. The full color main scanning lines each thus formed are arranged side by side in the sub-scanning direction, whereby the color photosensitive sheet 40 is recorded with a two-dimensional full color latent image. The latent image is developed into an actual image by a known developing means not shown.

The refractive index profile type lens array 30R may comprise SELFOC® lenses each opposed to one organic EL element 20R. The other refractive index profile type lens arrays 30G and 30B are similar to the refractive index profile type lens array 30R.

The surface red light emitting element array 6R, the surface green light emitting element array 6G, and the surface blue light emitting element array 6B are driven to emit light in a pulse-like fashion, and for instance, by controlling the pulse width, gradation can be generated for each pixel and the color photosensitive sheet 40 can be recorded with a continuous gradation image. Further, a part of the color photosensitive sheet 40 undergoes exposure to green light 64 times by the surface green light emitting element array 6G, to red light 32 times by the surface red light emitting element array 6R, and to blue light 32 times by the surface blue light emitting element array 6B and undergoes multiple exposure to light, 128 times in total, whereby a large dynamic range of exposure can be ensured and an image of high gradation can be recorded.

When the multiple exposure described above is effected, non-uniformity in the amounts of light emission in the main scanning direction is uniformed by superposing light from a plurality of organic EL elements 20R, 20G or 20B arranged in the sub-scanning direction and accordingly, occurrence of the score unevenness described above can be suppressed.

In this particular embodiment, the number of the cyan developing linear red light emitting arrays forming the surface red light emitting element array 6R is 32 (Nc=32), the number of the magenta developing linear green light emitting arrays forming the surface green light emitting element array 6G is 64 (Nm=64), and the number of the yellow developing linear blue light emitting arrays forming the surface blue light emitting element array 6B is 32 (Ny=32) Accordingly, the conditions Ny<Nm and Nc≦Nm described above are satisfied, which effectively prevent occurrence of the scoring unevenness in magenta or cyan while preventing unnecessary increase in the cost of the exposure system due to excessive number of the yellow developing linear blue light emitting arrays for the reason described in detail above.

In this particular embodiment, the dispersion σc of the amounts of light emission from the light emitting elements in the linear red light emitting element arrays, the dispersion σm of the amounts of light emission from the light emitting elements in the linear green light emitting element arrays and the dispersion σy of the amounts of light emission from the light emitting elements in the linear blue light emitting element arrays are 2% (0.02). Accordingly, $\sigma c/Nc^{1/2}=0.02/32^{1/2}=0.0035$, $\sigma m/Nm^{1/2}=0.02/64^{1/2}=0.0025$, and $\sigma y/Ny^{1/2}=0.02/32^{1/2}=0.0035$ and the conditions $\sigma c/Nc^{1/2}\leq0.004$, $\sigma m/Nm^{1/2}\leq0.003$, $\sigma y/Ny^{1/2}\leq0.009$ are satisfied and the scoring unevenness is suppressed for all of magenta, cyan and yellow to such an extent that it cannot be detected unless the image is gazed at.

Further, in this embodiment, since the two areas that is, the G area and the R and B areas are simultaneously driven in passive matrix independently of each other as described above. With this arrangement, the peak strength of each light emitting element can be reduced to half and the reliability can be improved as compared with the case where all the R, G, B areas are driven as a simple matrix since the drive duty of each light emitting element is 1/64 in this embodiment whereas that is 1/128 when all the R, G, B areas are driven as a simple matrix.

To form the R area, G area and B area on one substrate is not necessary but the R area and the B area may be formed on one substrate with the G area formed on another substrate. Otherwise, the R area, G area and B area may be formed all on different substrates to form a plurality of units with the units used in combinations.

Further, the separation of the R area, G area and B area need not be limited to the illustrated embodiment but one area may be formed by 64 linear green light emitting element arrays and 16 linear red light emitting element arrays with the other area formed by the remaining 16 linear red light emitting element arrays and 32 linear blue light emitting element arrays.

Further, the arrangement of the ICs for driving the anodes and the cathodes need not be limited to the illustrated embodiment. For example, in place of the two 64ch cathode drive ICs, one 128ch dual scan cathode drive IC having a function equivalent to that of the two 64ch cathode drive ICs may be provided. Further, in place of the sixty 260ch anode drive ICs, thirty 520ch anode drive ICs may be provided.

An exposure system in accordance with a second embodiment of the present invention will be described, hereinbelow. The exposure system of this embodiment differs form that of the first embodiment only in that the number Nc of the cyan developing linear red light emitting arrays, the number Nm of the magenta developing linear green light emitting arrays, and the number Ny of the yellow developing linear blue light emitting arrays.

That is, Nc=64, Nm=100 and Ny=16 in this embodiment. Also in this embodiment, the conditions Ny<Nm and Nc≦Nm described above are satisfied, which effectively prevent occurrence of the scoring unevenness in magenta or cyan while preventing unnecessary increase in the cost of the exposure system due to excessive number of the yellow developing linear blue light emitting arrays.

Further, since Ny<Nc in this embodiment, occurrence of the score unevenness in cyan where the score unevenness is more sensitive than in yellow is certainly suppressed while unnecessary increase in the cost of the exposure system due to excessive number of the linear blue light emitting arrays can be avoided in a similar manner.

Figure 4:
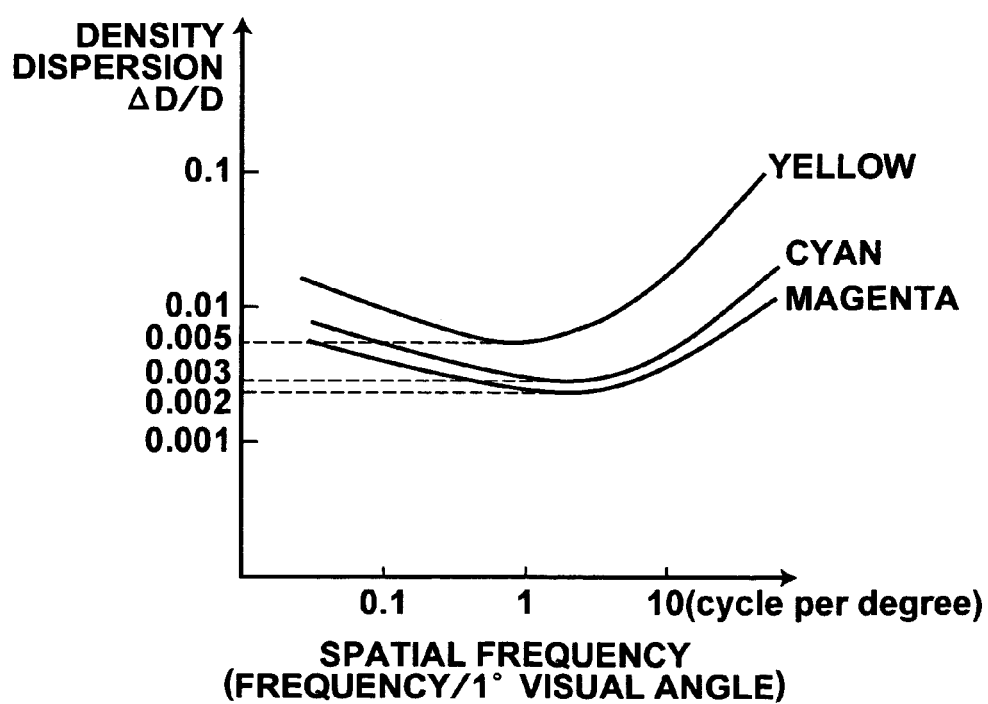
FIG. 4 is a graph showing the frequency-dependency of the human visual sensitivity versus the density unevenness of the image.

Further, since Nm/Ny=6.25 and Nc/Ny≧=2.78, occurrence of the score unevenness in magenta where the score unevenness is more sensitive is certainly suppressed while unnecessary increase in the cost of the exposure system due to excessive number of the linear blue light emitting arrays can be avoided. The reason is as described above with reference to FIG. 4.

Further, in this embodiment, the dispersion σc of the amounts of light emission from the light emitting elements in the linear red light emitting element arrays, the dispersion σm of the amounts of light emission from the light emitting elements in the linear green light emitting element arrays and the dispersion σy of the amounts of light emission from the light emitting elements in the linear blue light emitting element arrays are 2% (0.02) as in the first embodiment. Accordingly, $\sigma c/Nc^{1/2}=0.02/64^{1/2}=0.0025$, $\sigma m/Nm^{1/2}=0.02/100^{1/2}=0.002$, and $\sigma y/Ny^{1/2}=0.02/16^{1/2}=0.005$ and the conditions $\sigma c/Nc^{1/2}\leq0.004$, $\sigma m/Nm^{1/2}\leq0.003$, $\sigma y/Ny^{1/2}\leq0.009$ are satisfied and the scoring unevenness is suppressed for all of magenta, cyan and yellow to such an extent that it cannot be detected unless the image is gazed at.

Figure 5:
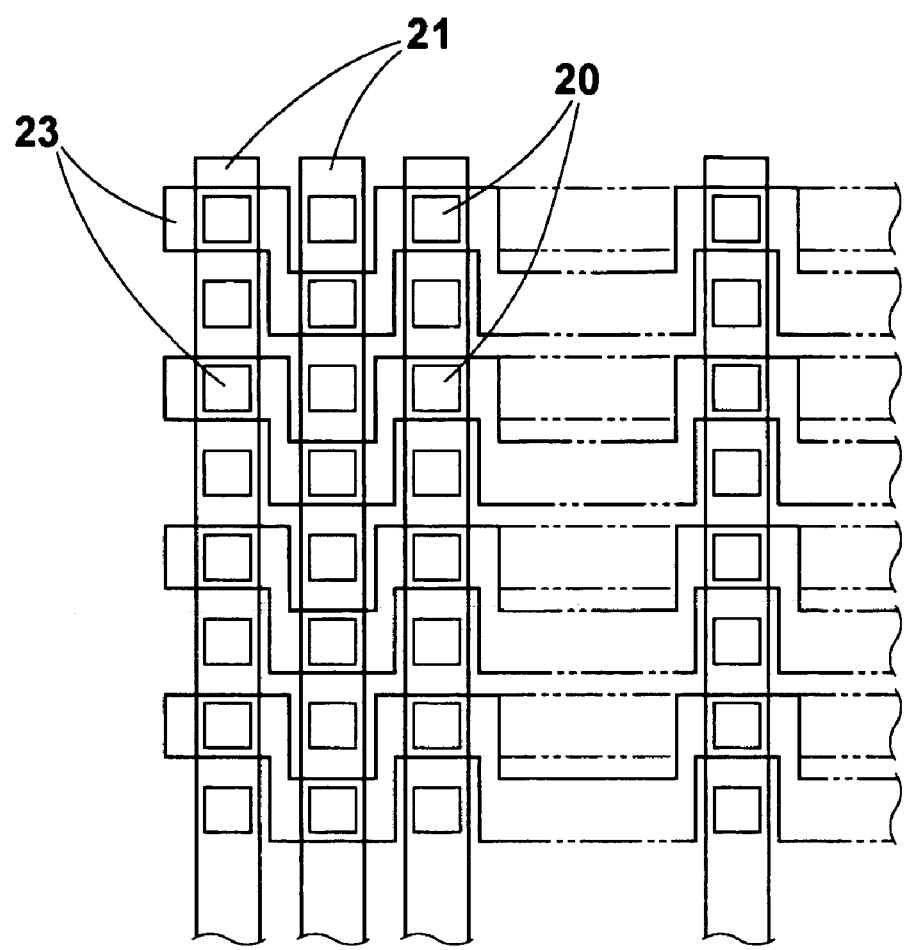
FIG. 5 is a plan view showing another example of shapes of the electrodes in the surface emitting element array.

The transparent anodes 21 and the metal cathodes 23 both may be arranged straight as shown in FIG. 3. However, the metal cathodes 23 may be bent as shown in FIG. 5 so that the organic EL elements 20 are arranged in a zigzag pattern. In this case, since two lines of linear emitting element arrays can be formed with a single metal cathode 23, the drive circuit and the control circuit can be simplified as compared with the case where one metal cathode is allotted to one linear emitting array. The present invention can be applied to exposure systems with such an arrangement. However, in this case, though N linear emitting element arrays are arranged in the sub-scanning direction, the number of the linear light emitting element arrays which expose the same parts of the photosensitive body is N/2.

Though, in the exposure systems described above, cyan, magenta and yellow are developed by red light, green light and blue light, they may be developed by light in other wavelength ranges. For example, it is possible to develop cyan, magenta and yellow by, for instance, three wavelengths in an infrared region and the present invention can be applied to the exposure systems so arranged.

Further, the surface emitting element array may be formed by light emitting elements other than the organic EL elements such as elements comprising a combination of an aperture mask and an LED (light emitting diode), liquid crystal shutter elements, PLZT elements or the like as described above.

What is claimed is:

1. An exposure system for exposing a color photosensitive body including therein first, second and third photosensitive materials which respectively develop into cyan, magenta and yellow comprising an exposure head formed by a surface emitting element array formed by a plurality of first to third linear emitting element arrays arranged in a sub-scanning direction substantially perpendicular to a main scanning direction, each of the first linear emitting element arrays comprising a plurality of first light emitting elements which are arranged in the main scanning direction at predetermined pitches and each of which sensitizes the first photosensitive material, each of the second linear emitting element arrays comprising a plurality of second light emitting elements which are arranged in the main scanning direction at predetermined pitches and each of which sensitizes the second photosensitive material, and each of the third linear emitting element arrays comprising a plurality of third light emitting elements which are arranged in the main scanning direction at predetermined pitches and each of which sensitizes the third photosensitive material, and a sub-scanning means which moves the color photosensitive body and the exposure head in the sub-scanning direction relatively to each other, so that the same parts of the photosensitive body are exposed a plurality of times respectively by the first to third linear emitting element arrays with progression of the sub-scanning, thereby exposing the color photosensitive body to two-dimensional imagewise light, wherein the improvement comprises that the first to third linear emitting element arrays satisfy conditions Ny<Nm and Nc≦Nm, wherein Nc, Nm and Ny respectively represent the numbers of the first to third linear emitting element arrays.

2. An exposure system as defined in claim 1 in which Ny<Nc.

3. An exposure system as defined in claim 1 in which $6.25 \leq Nm/Ny$ and/or $2.78 \leq Nc/Ny$.

4. An exposure system as defined in claim 2 in which $6.25 \leq Nm/Ny$ and/or $2.78 \leq Nc/Ny$.

5. An exposure system as defined in claim 1 in which the first to third light emitting elements are red, green and blue light emitting elements.

6. An exposure system as defined in claim 1 in which the first to third light emitting elements comprises an organic EL element.

7. An exposure system as defined in claim 1 in which the first to third photosensitive materials are silver halide color photosensitive materials.

8. An exposure system for exposing a color photosensitive body including therein first, second and third photosensitive materials which respectively develop into cyan, magenta and yellow comprising an exposure head formed by a surface emitting element array formed by a plurality of first to third linear emitting element arrays arranged in a sub-scanning direction substantially perpendicular to a main scanning direction, each of the first linear emitting element arrays comprising a plurality of first light emitting elements which are arranged in the main scanning direction at predetermined pitches and each of which sensitizes the first photosensitive material, each of the second linear emitting element arrays comprising a plurality of second light emitting elements which are arranged in the main scanning direction at predetermined pitches and each of which sensitizes the second photosensitive material, and each of the third linear emitting element arrays comprising a plurality of third light emitting elements which are arranged in the main scanning direction at predetermined pitches and each of which sensitizes the third photosensitive material, and a sub-scanning means which moves the color photosensitive body and the exposure head in the sub-scanning direction relatively to each other, so that the same parts of the photosensitive body are exposed a plurality of times respectively by the first to third linear emitting element arrays with progression of the sub-scanning, thereby exposing the color photosensitive body to two-dimensional imagewise light, wherein the improvement comprises that the first to third linear emitting element arrays satisfy conditions $\sigma c/Nc^{1/2} \leq 0.004$, $\sigma m/Nm^{1/2} \leq 0.003$, $\sigma y/Ny^{1/2} \leq 0.009$, wherein Nc, Nm and Ny respectively represent the numbers of the first to third linear emitting element arrays, and $\sigma c$, $\sigma m$ and $\sigma y$ respectively represent the dispersions of the amounts of light emission from the plurality of light emitting elements in the first to third linear emitting element arrays.

9. An exposure system as defined in claim 8 in which $\sigma c/Nc^{1/2} \leq 0.003$, $\sigma m/Nm^{1/2} \leq 0.002$, $\sigma y/Ny^{1/2} \leq 0.005$.

10. An exposure system as defined in claim 8 in which the first to third light emitting elements are red, green and blue light emitting elements.

11. An exposure system as defined in claim 8 in which the first to third light emitting elements comprises an organic EL element.

12. An exposure system as defined in claim 8 in which the first to third photosensitive materials are silver halide color photosensitive materials.

* * * * *